US007000117B2

(12) United States Patent
Hiltunen et al.

(10) Patent No.: US 7,000,117 B2
(45) Date of Patent: Feb. 14, 2006

(54) METHOD AND DEVICE FOR AUTHENTICATING LOCALLY-STORED PROGRAM CODE

(75) Inventors: Matti Hiltunen, Helsinki (FI); Jarmo Miettinen, Espoo (FI); Marko Nordberg, Helsinki (FI); Jukka Liukkonen, Helsinki (FI)

(73) Assignee: Sonera Smarttrust Oy, Helsinki (FI)

( * ) Notice: Subject to any disclaimer, the term of this patent is extended or adjusted under 35 U.S.C. 154(b) by 762 days.

(21) Appl. No.: 10/011,142

(22) Filed: Nov. 12, 2001

(65) Prior Publication Data

US 2002/0091938 A1 Jul. 11, 2002

(30) Foreign Application Priority Data

May 18, 2000 (WO) .................. PCT/FI00/00448

(51) Int. Cl.
*G06F 11/30* (2006.01)
(52) U.S. Cl. .................. 713/182; 713/170; 713/168; 713/200; 713/201
(58) Field of Classification Search ................ 713/182, 713/170, 168, 200, 201
See application file for complete search history.

(56) References Cited

U.S. PATENT DOCUMENTS

| 4,264,782 | A | * | 4/1981 | Konheim ................. 705/75 |
| 4,593,353 | A | | 6/1986 | Pickholtz |
| 4,723,284 | A | * | 2/1988 | Munck et al. ............ 713/159 |
| 4,964,164 | A | * | 10/1990 | Fiat ...................... 380/30 |
| 5,224,160 | A | | 6/1993 | Paulini et al. |
| 5,442,645 | A | | 8/1995 | Ugon et al. |
| 5,491,752 | A | * | 2/1996 | Kaufman et al. .......... 380/30 |

FOREIGN PATENT DOCUMENTS

| EP | 0304033 | 2/1989 |
| EP | 0 962 850 A2 | 12/1999 |
| WO | WO 98/10611 | 3/1998 |
| WO | WO 98/15082 | 4/1998 |

OTHER PUBLICATIONS

Stallings, William Data and Computer Communications, New Jersey: Prentice Hall Inc. 1997, ISBN 0-13-571274; pp. 640-643, especially figure 18.11c.

* cited by examiner

*Primary Examiner*—Thomas R. Peeso
(74) *Attorney, Agent, or Firm*—Cohen, Pontani, Lieberman & Pavane

(57) ABSTRACT

In a method and system for authenticating locally-stored program code, a first checksum is computed using the locally-stored program code, the computed checksum is compared with a second checksum known to be valid and, if the two checksums are determined to match, the locally-stored program code is deemed valid and authentic. For increased certification reliability and dependability, before computation of the first checksum a predetermined challenge is added to the stored program code, so that the first checksum is computed from the combination of the stored program code and the challenge. This enhancement enables secure use of stored program code in applications that demand high security. Users of such software may therefore rely on the authenticity of the data processed by the software and of the data and results reported on the display of a mobile phone or keyboard throughout the entire process or transaction.

18 Claims, 2 Drawing Sheets

METHOD AND DEVICE FOR AUTHENTICATING LOCALLY-STORED PROGRAM CODE

BACKGROUND OF THE INVENTION

1. Field of the Invention

The present invention relates to communication systems and, in a particular implementation and aspect, to methods and systems for testing the reliability of software.

2. Description of Related Art

Mobile communication networks, such as GSM (Global System for Mobile communications) networks, have recently become extremely widespread and popular. Additional services that are connected with and accessed via these mobile networks, and in fields that are quite varied and versatile, have correspondingly increased at an accelerated pace. For example, a mobile telephone may be used as a means of payment for minor purchases, as for soft drinks and automated car washes. Everyday activities, such as payment transactions, banking services, etc., have also been added, and will continue to be added, to the functionality of and which is provided by and through current mobile phones. Next generation mobile stations will be even more advanced in respect of the realizable level of service and data transfer capacities as compared with current and prior mobile stations.

With the aid of digital signing, which is widely recognized to be a general requirement for commercial implementations of electronic payment, it is possible to insure the coherency of the information to be sent and the identity of the source address. A digital signature is derived by encrypting a checksum which has been computed using the information to be sent with a sender's private key. Since only the sender knows the corresponding private key, when the encrypted information is decoded using the sender's public key the recipient can readily confirm that the information sent has not been modified and that it has been generated using the genuine private key which is known only to the sender. One example of an algorithm commonly used in digital signing is the RSA ciphering algorithm, which is based on an encryption system using the public and private keys of an individual or party and which is also used for the encryption of messages.

In the public key infrastructure a user maintains secrecy and control over that user's private key, but makes the corresponding public key freely available to all others. It is nevertheless not enough to simply store the public key in an accessible location, such as in an electronic mail directory or public database, because a third party could modify or forge the stored public key to make the forger the apparent authentic owner of the key. Instead, certification and security certificates are used to serve as proof given by a trusted party (the certification authority) of the fact that the name, identification number and public key belong to the same person. The certificate is typically a combination consisting of a public key, a name and identification number, etc, which the certification authority has then signed with the private key of the certification authority.

When the recipient of a digitally signed message wishes to confirm the authenticity of the message, that recipient must first obtain the digital certificate, which will provide the recipient with the public key and the name of the sender of the message. The recipient must then authenticate the certificate, which requires him or her to obtain additional certificates (i.e. a certification chain) for use in authenticating the subject certificate.

Where the certificate is thereby determined to be authentic, the recipient can authenticate the signature of the received message by using the public key that accompanied the certificate. If the signature passes the test, then the sender has been confirmed to be the person identified by the certificate. In certification arrangements, a special block list is used to list certificates that have been taken out of use; thus, directory services are needed to support and enable access to both the certificates and the block list.

The design and construction of mobile phones utilize at least partly embedded systems and software. These implementations permit at least partial modification of the original software and of the functionality provided by the mobile phone, thereby permitting the phone to be updated by the mobile provider. However, this same capability for intended modification likewise permits modification for improper purposes. Thus, by suitably modifying the software the content of electronic payment messages may be changed for the specific purpose of defrauding the user or service provider in carrying out a transaction, such as by changing account numbers, sums subject to transfer or payment, digital signatures, etc., even though the user may view or be provided with the correct information about the transaction on a display screen of the mobile phone.

It is at the present time impossible for the user to check or determine whether the mobile phone that he is using contains or is operating with the original (or otherwise legitimately modified) software of the manufacturer or, alternatively, if the software has been otherwise modified. Where the mobile phone is utilized for carrying out banking services, such as for payments or transfers of funds, the user must have the ability to verify that the device is using the valid, original, authorized version of the relevant software.

What is most important to the user is the ability to determine or verify the reliability of the display and keyboard, the presence of security, the security and reliability of the communication channels used by the mobile device, and the originality or authenticity of the components or software associated with the provision of security, such as secure storage of subscriber identification data, passwords and key codes. In addition, the user must be able to check the software at random and unpredictable times at which the software is not otherwise prepared or expecting to be checked.

In principle, software may be checked or validated by way of so-called direct checking in which two independent checksums are computed on the mobile phone software, as for example using an effective hash function such as SHA-1 or MD5 or the like, and are then compared. The first checksum is computed on the software stored on the mobile phone itself and the second is computed by the manufacturer or supplier of the original software. The first and second checksums are then compared and, if they match, the software of the mobile phone is deemed to be original and authentic. However, the problem associated with this known solution is the fact that modified or forged software may itself be programmed to ignore the results of the comparison, and instead print or report only the original checksum as if it were the newly computed checksum that was requested by the user.

OBJECTS AND SUMMARY OF THE INVENTION

It is therefore the desideratum of the present invention to provide a method and apparatus or system for eliminating, or at least significantly reducing, the drawbacks and deficiencies existing in the prior art, including by way of example those described hereinabove.

It is a particular object of the invention to provide a method and apparatus for reliable checking of the authenticity and validity of software in a mobile station, although the invention may also be used for like testing of any kinds of software in a wide variety of operating environments and hardware.

It is another object of the invention to provide a method and apparatus for reliably authenticating a program or program code that is stored on a storage device by, inter alia, computing a first checksum of the stored program code, and comparing the computed first checksum with a second checksum known to be valid whereby, when the two checksums match, the program code has been reliably determined to be authentic.

A still further object of the invention is to provide a reliable and variable method by which different service providers and users of their services may insure the authenticity of the devices and programs being used.

The method of the present invention utilizes so-called direct checking to confirm the authenticity of locally-stored software and/or hardware. The manufacturer or supplier of the original software announces, as for example periodically, a variable challenge and corresponding checksum or multiple sets of challenges and corresponding responses or checksums, each checksum relating to a particular one of the challenges. The or each challenge is chosen from a group which consists of a character string, a program function and an input. When the user, at a random time, wishes to check the authenticity of the software that he or she is using, the user stores or inputs the challenge into the device, such as a mobile phone, with which the software is being used. The challenge is stored in the same memory as is the software to be checked, and the device then computes the checksum, i.e. the response, at the memory space containing both the software and challenge through the use of a check algorithm. The device reports this response to the user, who compares it with the known "proper" response to that challenge and, if the two responses match, the user thereby knows that the software is authentic and original. It is thus possible, through the use of this inventive procedure, to compare two programs having the same origin; by using software known to be secure, and randomly chosen challenges, the responses provided by the known secure software may be readily and reliably compared with the responses provided by the software to be checked and authenticated.

The user may for example retrieve the challenge and the corresponding checksum from a database which is maintained on a safe or secure network server that is available to or otherwise accessible by the user, or from or on any type of media to which the user has access. The same database may also maintain the valid program code into which the user may input the same challenge as that input to the software in the user's own device for use in comparing the two resulting computed checksums.

In accordance with the inventive method, a first checksum is computed at or from the local program code, the so-computed first checksum is compared with a second checksum known to be valid and, in response to the results of that comparison, the program code is determined to either be authentic (where the two checksums match) or unexpectedly modified and therefore of doubtful or questionable authenticity (where the two checksums do not match).

In further accordance with the invention a challenge is added to the program code, and it is only after this addition of the challenge that the first checksum is computed from the combination of the program code and the challenge. In a preferred but nonetheless illustrative implementation, the challenge is one of an input, a particular character string, or corresponding data that is added to the program code so that the checksum computation yields a certain outcome. In one embodiment, the program code and the challenge are stored in the same memory space, and the checksum is computed using the entire memory space in which the program code and challenge are stored. The challenge to be input or added may also be modified through the use of an appropriate algorithm that produces a challenge of a predetermined standard format for addition to the program code irrespective of the characteristics or details of the initial character string of the unmodified challenge. In this manner the addition of the challenge to the program code is effectively standardized, thus rendering easier the implementation of the authentication process. For example, the SHA-1 hashing algorithm always produces a 160-bit challenge irrespective of challenge length, so that hashing of the initially-input or received challenge will assure that a challenge of standard length will always be added to the program code before computation of the first checksum. Moreover, such hashing of the original challenge before it is added to the program code has no effect on the reliability or functioning of the challenge and checksum pair, so long as the challenge is hashed using an algorithm that is widely known and which always produces the same hash from the original challenge.

In implementing the invention a specified memory region or area, corresponding in size to a challenge, in the software or program code to be checked may be exchanged with the challenge, or the challenge may be simply added to that memory area, or the memory area may be left blank in which case the challenge will be an empty character string. Adding the challenge may also comprise removal of a predetermined part of the program code before computing the checksum. In each of these cases, the checksum computed at or from the memory space is unique and unpredictable and depends solely on the combination of the program code and the challenge.

In one contemplated implementation of the invention, the challenge and corresponding checksum are selected from a group of random challenges which comprises pairs of challenges and their corresponding checksums. New pairs of challenges and checksums may be regularly or otherwise periodically generated, thus further preventing and discouraging fraud and deception. Improved reliability can also be attained by selecting the challenges and corresponding checksums so that the freed memory cannot be used for storing the check list. Moreover, it is important that at least until the authentication process is completed the storage device not be connected to an external database, terminal device or any other device from which it can retrieve or request the known (i.e. confirmed valid) checksum that corresponds to the challenge, and that the necessary computing routines be carried out solely by or with the local software.

In another implementation of the invention, an authenticated program code may be used to authenticate other program code included in the same software or system or network, wherein the computed checksum of the authenticated program code is compared with a checksum computed from other program code using the same challenge. This for example provides an advantageous way of utilizing an authenticated program code of a first user to authenticate the same program code of a second user. Thus, by way of illustration, the mobile phone of the first user might transmit a message to the mobile phone of the second user relaying the particular challenge, which the user of the second mobile station would then use for authentification testing of the second user's software. A like system and method may be employed for automated testing whereby the network transmits, as during initialization of a call, a challenge to the telephone to which the telephone responds by transmitting the checksum computed using the combination of the local software and the transmitted challenge. If the computed checksum is not valid, the network draws the necessary conclusions and informs the user, as well as other necessary parties, of the situation.

One particular advantage of the present invention, as compared with the prior art, is that embedded systems or software known to be reliable may be implemented and their continuing reliability checked and verified at any later or subsequent time.

A further advantage of the invention as compared with the prior art is that computation of the checksum need not be an external function but, instead, such functionality may be integrated into the software to be checked. Moreover, by virtue of the present invention it is unnecessary to utilize both the public and private keys of a user.

In addition, use of the invention requires less random access memory than prior art methods and systems because the program code need not be decoded or modified in the user's device. Finally, as a consequence of the dynamics of the challenge and corresponding checksum, the checksum does not need to be known beforehand, and generation of the challenges can therefore be randomly carried out.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE CURRENTLY PREFERRED EMBODIMENTS

Figure 1:
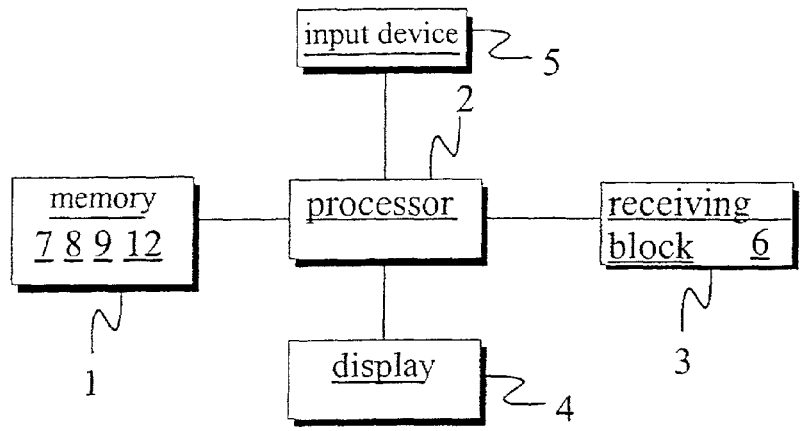
FIG. 1 is a schematic block diagram of a system constructed in accordance with the present invention.

The device depicted in FIG. 1 and constructed in accordance with the present invention comprises a memory 1, a processor 2, a receiving block 3, a display 4 and an input device 5, all variously connected to one another. The memory is divided into a static part A and a dynamic part B. In order to reduce fraud or deception, the size of the dynamic part B is preferably selected so that the checksum that corresponds to the challenge is unable to fit within the dynamic part B. Memory 1, receiving block 3, display 4 and input device 5 are each connected to processor 2.

One implementation of the device shown in FIG. 1 could be a mobile station for use with a telecommunication network or system. Such a mobile station will comprise a central processing unit as well as the processor 1, memory 2, receiving block 3, display 4 and a data-entry keyboard. On the other hand, as will become apparent in this disclosure the present invention lies not in the particular application to which the herein described methods and apparatus are applied; rather, the inventive methods and systems may be employed or implemented in a wide range of devices and processes used, as is currently contemplated by way of preferred but nonetheless illustrative functionality, in effecting or carrying out electronic transactions.

The device depicted by way of representative block diagram in FIG. 1 further comprises means 12 for computing the checksum of the stored program code, means 6 for adding a predetermined challenge to the stored program code, and means 7 for computing a first checksum from the combination of the program code and challenge. In one contemplated application of the invention, the means 7 and means 12 may for example be implemented using a certified program code that is stored in the memory 1.

The device of FIG. 1 additionally comprises means 8 for storing the program and challenge in the memory space 1, and means 9 for computing the checksum of the entire static memory space A in which the program code and challenge are stored. The device also comprises, or may be used in conjunction with, equipment 10 for receiving the challenge on the storage device via keyboard 5.

Figure 2:
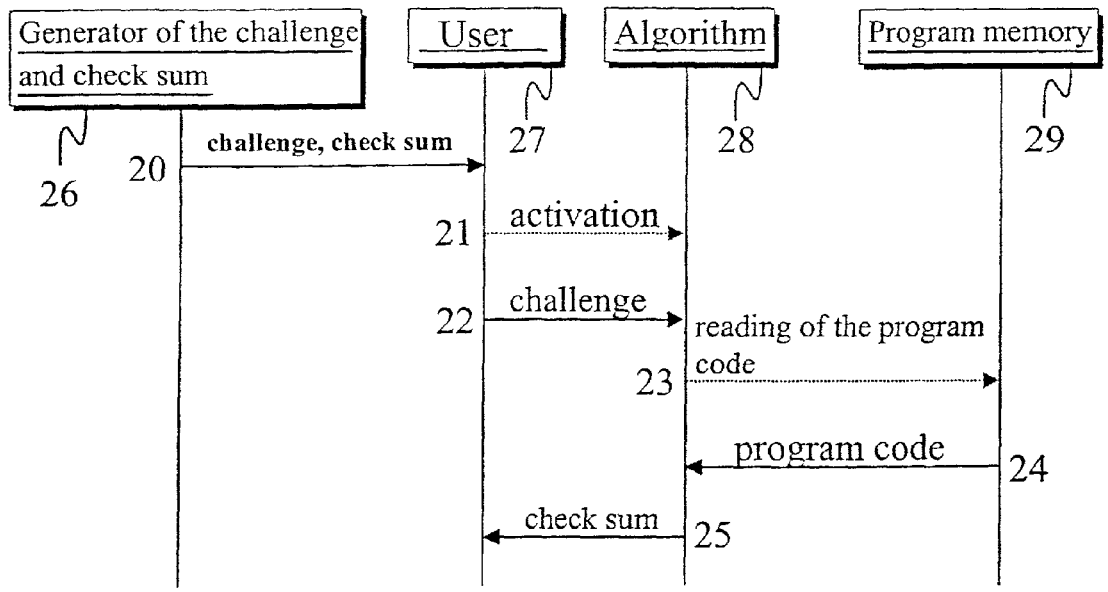
FIG. 2 depicts an authentication method in accordance with the invention.

FIG. 2 presents a block diagram from which the inventive method and functionality will be readily understood. In the illustrated embodiment, the generator 26 of both the challenge and the corresponding checksum is an outside certification authority different from the user 27, as for example the manufacturer or supplier of the program or a trusted third party that holds the original program code. The user receives the challenge and the corresponding checksum (arrow 20) from the outside certification authority, as from a secure Internet site of the certification authority. The user 27 activates the check prompt function of the device (arrow 21). The device requests that the user enter the challenge, which the user then inputs into the device (arrow 22). The device may, by way of illustrative example, be a mobile phone. The program code, stored in the program memory 29, is read using the algorithm 28 (arrows 23 and 24), and the checksum is computed from the combination of the stored program code and the input checksum using an appropriate method. Computation of the checksum may for example be effected using a hash function, such as the MD5 or SHA-1 hash functions. The computed checksum resulting from the application of algorithm 28 is returned to the user 27 who requested it (arrow 25). User 27 reads the computed checksum on the mobile phone or device display and compares it with the checksum obtained from the outside certification authority. If the two checksums match, the stored program code of the device is deemed authenticated and valid.

An important aspect of the present invention is that the challenge is not beforehand known and, as a consequence, the checksum corresponding to the challenge is impossible to anticipate. The challenge to be input must, in addition, be of sufficient length to achieve the intended reliability of result. Moreover, the known-valid checksum is not input to the program, so that a corrupted or modified program cannot dynamically adapt itself to the particular circumstances in accordance with such an entered checksum. When generating the checksum, the entire program code that is to be checked is read using an algorithm. The challenge and program code are combined in such a way that a corrupted or modified program cannot compute the combination of the result of the checkout and the challenge corresponding to the original program code and still come to the right conclusion.

Figure 3:
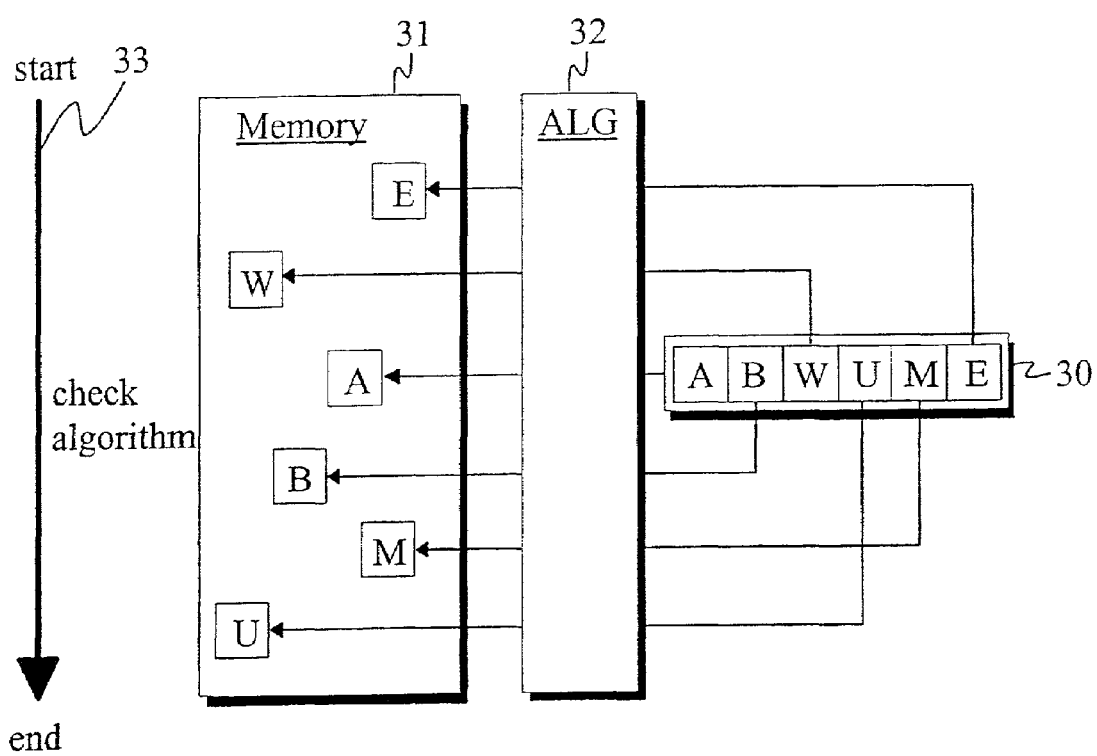
FIG. 3 is a block diagram showing a system and process for computing a checksum in accordance with the invention.

From FIG. 3 will be understood a preferred manner of generating the checksum in accordance with the invention. The user wishes to assure the originality and authenticity of the software that he or she is using. To implement the checkout a random challenge 30, with which the checkout is carried out, has been generated. In this particular example the challenge 30 is a character string consisting of the characters A, B, W, U, M and E. Each of the characters of the challenge 30 is located somewhere in the memory space 31; the location of the challenge is defined by the location algorithm 32. The location algorithm may for example function such that a character included in the challenge is added to a certain memory address of memory space 31 or, alternatively, so that a predetermined computational operation is carried out between the character and the content of a particular memory address, with the result of the computational operation being stored or located at the memory address in question. Arrow 33 indicates the direction of processing of the check algorithm. When all of the characters included in the challenge have been appropriately located or relocated in the memory space 31, a checksum is computed from the entire memory area using, for example, a hash algorithm such as the MD5 or SHA-1 algorithms.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. In a method for authenticating program code stored on a storage device in which a first checksum of the stored program code is computed, the first checksum is compared with a second checksum known to be valid, and the program code is deemed authenticated if the compared first and second checksums match, the improvement comprising:
   one of storing on the storage device and inputting into the storage device, at a random time when the program code is to be authenticated, a challenge comprising one of a character string, a program function and an input to the storage device;
   adding the challenge to the stored program code to form a combination of the challenge and the stored program code;
   computing the first checksum from the formed combination.

2. In a method in accordance with claim 1, further comprising the step of announcing, by a manufacturer of the program code, a new challenge and a corresponding new second checksum known to be valid for use in authenticating the stored program code.

3. In a method in accordance with claim 2, wherein said announcing is performed periodically.

4. In a method in accordance with claim 1, further comprising the step of retrieving, from one of a database and a storage medium, at least one of the challenge and the second checksum for use in the comparison of the first and second checksums.

5. In a method in accordance with claim 1, further comprising the step of selecting the challenge from a random group comprising sets of available challenges and corresponding second checksums.

6. In a method in accordance with claim 1, wherein said step of inputting the challenge into the storage device comprises transmitting the challenge to the storage device from one of an outside terminal, an outside certification authority and a communication network at an initialization phase of the storage device.

7. In a method in accordance with claim 1, wherein said step of forming the combination comprises substituting, for a predetermined part of the stored program code, the challenge before computing the first checksum from the combination.

8. In a method in accordance with claim 1, wherein said step of adding comprises storing the program code and the challenge in a memory space of the storage device, and wherein said step of computing the first checksum comprises computing the first checksum using the entire memory space in which the program code and the challenge are stored.

9. In a method in accordance with claim 1, wherein the challenge has a length selected so that freed memory of the storage device cannot be used for storing a checksum corresponding to the challenge.

10. In a method in accordance with claim 1, further comprising the step of, after authenticating the program code stored on the storage device, comparing the computed first checksum with a third checksum computed from the combination of the challenge and program code stored on a different storage device so that, if the compared first and third checksums are found to match, the program code stored on the different storage device is thereby deemed authenticated.

11. In a method in accordance with claim 1, further comprising the step of preventing communications between the storage device and external contacts until the stored program code has been authenticated within the storage device.

12. In a method in accordance with claim 1, further comprising the step of modifying the input challenge, prior to adding of the challenge to the stored program code to form the combination, using an algorithm for placing the challenge in a predetermined standard format.

13. In a device operable for authenticating a program code of the device and that comprises a data processor, data storage connected to the data processor, a display connected to the data processor, and a keyboard connected to the data processor, the improvement comprising:
   means for adding, to the program code, a predetermined challenge comprised of one of a character string, a program function and an input to the device, to form a combination of the program code and the predetermined challenge; and
   means for computing a first checksum from the formed combination of the program code and the predetermined challenge for use of said first checksum in authenticating the program code.

14. In a device in accordance with claim 13, further comprising means for storing the program code and the predetermined challenge in a static memory space of the data storage of the device, and wherein said means for computing the first checksum is operable for computing the first checksum from all of the static memory space in which the program code and the predetermined challenge are stored.

15. In a device in accordance with claim 13, further comprising means for receiving the predetermined challenge from the keyboard.

16. In a device in accordance with claim 13, further comprising means for retrieving one of the predetermined challenge and a second checksum known to be valid for comparison with the computed first checksum from one of a database and a storage medium.

17. In a device in accordance with claim 13, further comprising means for receiving the predetermined challenge from one of an outside terminal, an outside certification authority and a communication network at an initialization phase of the device.

18. In a device in accordance with claim 13, further comprising means for substituting, for a predetermined part of the program code, the predetermined challenge before computing the first checksum.

* * * * *

UNITED STATES PATENT AND TRADEMARK OFFICE
CERTIFICATE OF CORRECTION

PATENT NO. : 7,000,117 B2 Page 1 of 1
APPLICATION NO. : 10/011142
DATED : February 14, 2006
INVENTOR(S) : Matti Hiltunen et al.

It is certified that error appears in the above-identified patent and that said Letters Patent is hereby corrected as shown below:

Title page,
Item [63], Related U.S. Application Data, add the following:
-- [63]           Continuation Date
This application is a continuation of PCT Application No. PCT/FI00/00448, filed May 18, 2000. --.
Item [30], replace with the following:
-- [30] Foreign Application Priority Data
May 18, 1999                               FI 991134 --.

Column 1,
Line 5, add the following before the heading "BACKGROUND OF THE INVENTION":
-- This is a continuation of PCT Application No. PCT/FI00/00448, filed on May 18, 2000, which claims priority from Finland Application No. FI 991134, filed May 18, 1999. --.

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 7,000,117 B2
APPLICATION NO. : 10/011142
DATED : February 14, 2006
INVENTOR(S) : Matti Hiltunen It is certified that error appears in the above-identified patent and that said Letters Patent is hereby corrected as shown below:

Please replace item (73) the Assignee information listed on the cover page with the following:

--(73) Assignee    Smarttrust Systems Oy
                                    Helsinki (FI)--

Signed and Sealed this

Twenty-sixth Day of December, 2006

JON W. DUDAS
*Director of the United States Patent and Trademark Office*